United States Patent

Schmidt et al.

[11] 3,915,046
[45] Oct. 28, 1975

[54] SEGMENTAL SAW BLADE

[76] Inventors: Hans V. Schmidt, Mount Vista Road, Kingsville, Md. 21087; Glenn C. Peck, 404 Stevenson Lane, Towson, Md. 21204

[22] Filed: Dec. 27, 1973

[21] Appl. No.: 428,792

[52] U.S. Cl. .................................................. 83/838
[51] Int. Cl.² ........................................ B23D 61/02
[58] Field of Search .............................. 83/838–855

[56] References Cited
UNITED STATES PATENTS
| 279,344 | 6/1883 | Connell | 83/838 |
| 2,714,317 | 8/1955 | Drake | 83/855 X |
| 2,974,695 | 3/1961 | Pfeffer | 83/855 |

FOREIGN PATENTS OR APPLICATIONS
| 190,696 | 7/1964 | Sweden | 83/838 |
| 179,647 | 9/1954 | Austria | 83/839 |
| 945,639 | 1/1964 | United Kingdom | 83/838 |

*Primary Examiner*—J. M. Meister
*Attorney, Agent, or Firm*—John F. McClellan

[57] ABSTRACT

A cold cutting circular saw blade of the attached-segment type having a stepped-peripheral-margin saw plate to which segments having complementary shape are affixed; the segment end-shape inclines at the front sharpening angle of the saw teeth.

4 Claims, 11 Drawing Figures

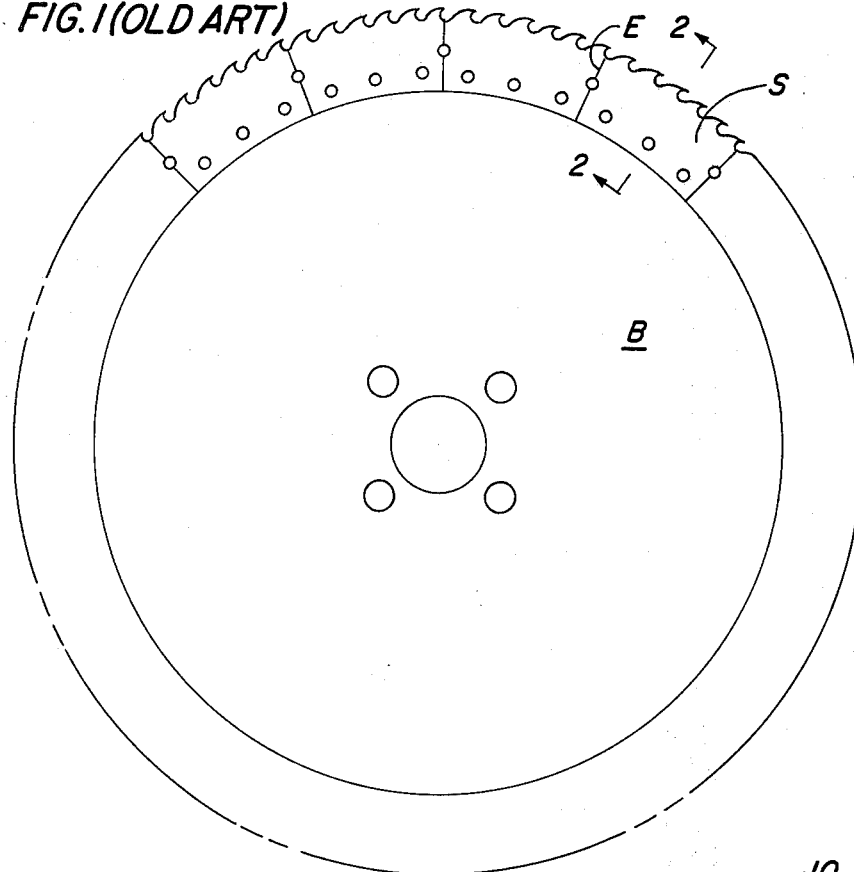
FIG.1 (OLD ART)
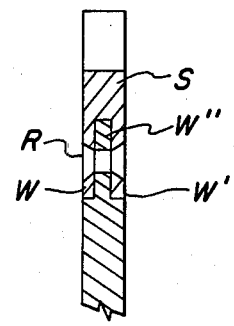
FIG.2 (OLD ART)
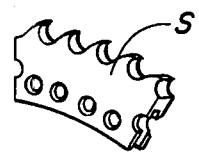
FIG.3 (OLD ART)
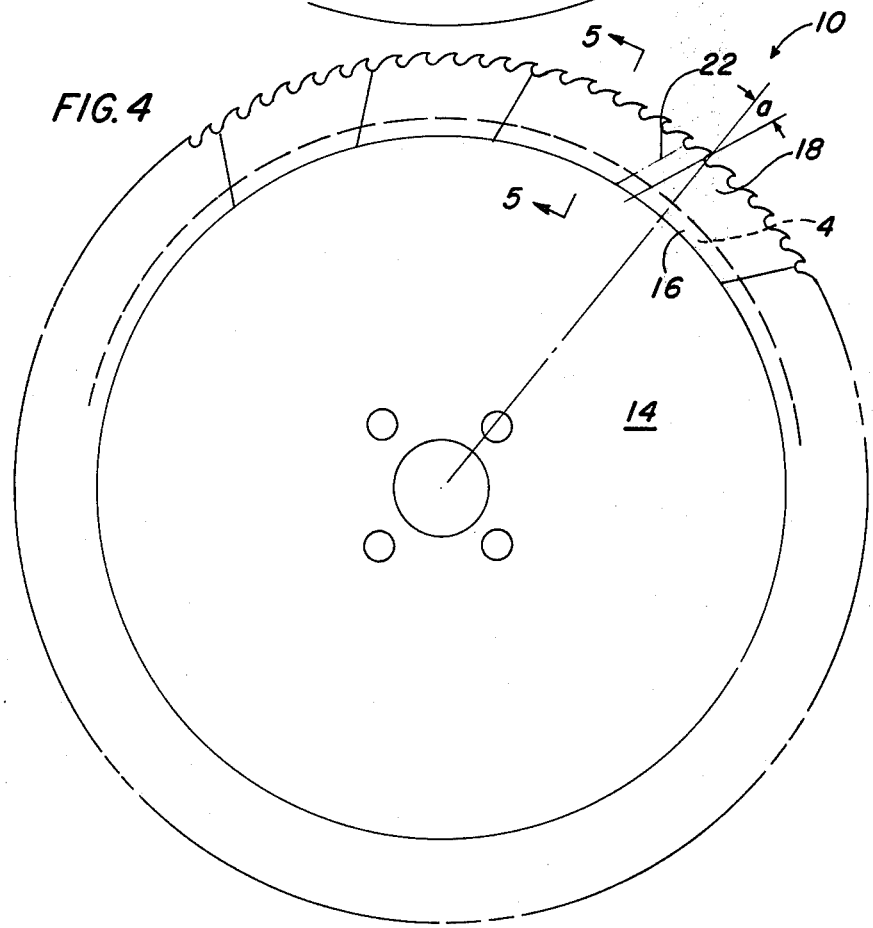
FIG.4
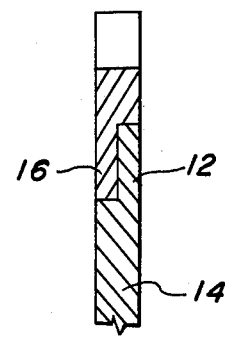
FIG.5
FIG.6

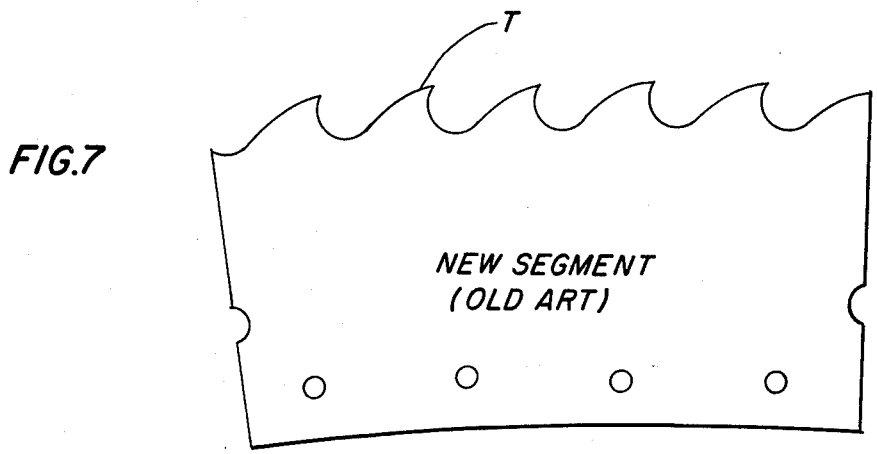
FIG.7 NEW SEGMENT (OLD ART)
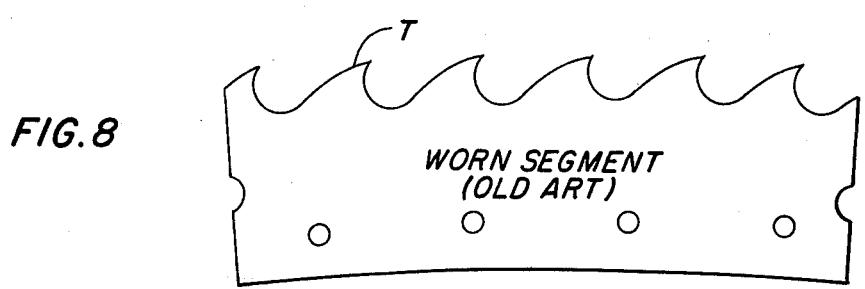
FIG.8 WORN SEGMENT (OLD ART)
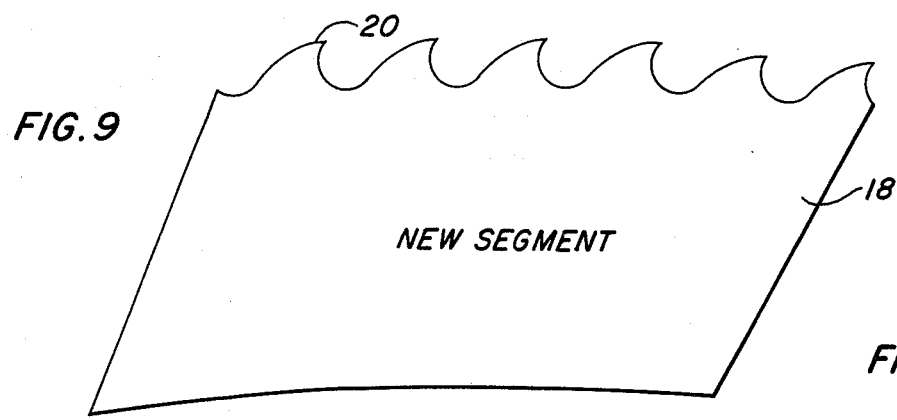
FIG.9 NEW SEGMENT
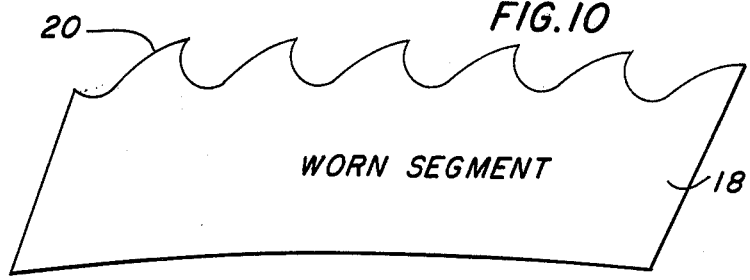
FIG.10 WORN SEGMENT
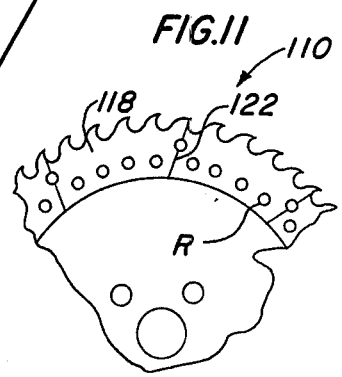
FIG.11

… … …

SEGMENTAL SAW BLADE

This invention relates generally to cutting tools and specifically to circular saws for cold sawing metal.

In the art of making cold sawing circular saws many inventions aim at producing an economical saw with a relatively malleable or non-embrittling inner disk or body and a suitable hard, heat resistant, and durable toothed periphery. Economy includes original cost, tool life, and cost of repairing damaged teeth. Tool life depends in part on sharpening life and in part on the accuracy with which tool shape can be restored after damage. Sharpening life depends on the diameter to which a saw can be reduced without appreciably weakening the teeth. Cost of repairing includes materials, materials availability, and skill required to restore the tool.

Original cost of good metal working circular saw blades ranges from less than a hundred dollars to several thousand dollars, depending in part on size, which may exceed 6 feet in diameter.

The most used designs require meticulous work for satisfactory repair. Under present conditions the dwindling number of skilled workmen often requires expensive replacement instead of repair.

A principal object of this invention is to provide a novel circular saw blade which combines the overall tool alignment and sharpening-life advantages of one-piece sawblade construction with the economies of inserted-segmental saw construction by providing segments with ends angled in conformance with tooth-sharpening angle, in preferred embodiment combined with rivetless stepped construction.

Advantages of the invention will become more apparent from the following. Like numerals refer to like parts.

FIG. 1 is a face view of a representative old-art saw blade;

FIG. 2 is an enlarged sectional view at 2—2, of FIG. 1, of a segment riveted to a saw plate;

FIG. 3 is an isometric view of a segment shown in preceding Figures;

FIG. 4 is a face view of a saw blade according to provisions of this invention;

FIG. 5 is an enlarged sectional view at 5—5, FIG. 4, of a segment soldered to a saw plate;

FIG. 6 is an isometric view of a segment shown in the proceding two Figures;

FIGS. 7 and 8 are face views of an old-art segment at different stages of service life;

FIGS. 9 and 10 are face views of a segment according to the present invention at different stages of service life;

FIG. 11 is a face view of a saw blade according to a further provision of this invention.

In FIGS. 1–3, old-art arc-shaped toothed-segments S attach to the periphery of disk-shaped saw plate B. A groove typically divides the segment inner periphery into paired webs W, W' (FIG. 2) and the saw plate may have a complementary web W'', or conversely, with each web comprising about one-third of the thickness. Flush rivets R secure the assembly. Segment ends E typically radiate from the center of the assembly.

Advantages over unitary construction are that tooth breakage can be rapaired by segment replacement and that the saw plate may be of mild steel to reduce cracking encountered with harder steels.

However, holes must be positioned with jig-borer precision in replacement segments, and the assembly must be riveted with great skill to prevent operational failures from misalignment. Web thinness and stress concentration at the rivets make operational failure more likely.

In FIGS. 4–6, a novel segmental saw 10, shown constructed in accordance with provisions of this invention, overcomes many of the old-art deficiences noted.

A peripheral annularly stepped web 12 on the saw plate 14 attaches to a complementary web 16 on each of the segments 18. In section (FIG. 5) each web is square-edged, and offset. Preferably the saw plate web and segment webs have equal thickness with the thickness of the webs being substantially one-half that of adjacent portions of the segments and saw plate.

Assembly and disassembly of the respective segments with respect to the saw plate is by silver soldering under local induction heating according to well known techniques, the silver soldering 17 being applied along the joints between segment and segment and between segment and sawplate, causing coating and joining of all interfaces. Since silver solder is readily obtainable in commercial varieties which melt at 1400° Fahrenheit or below, quick localized heating and cooling as by oil immersion can be accomplished.

Advantages of this invention include ease of precise assembly and disassembly of the segments with respect to the saw plate, the fast, controllable, localized limited-temperature heating and cooling which does not remove the cutting temper of the teeth; uniform, broad-area fastening of the segments of the saw plate and to each other without stress concentration, shear loads being taken through parallel interfaces rather than across rivets, and the equally thick, relatively massive webs on the saw plate and segments which seat each other laterally and at the shoulders, and which are substantially equally strong and rigid. There are no rivets to work loose and no rivet heads to hide cracks or inequalities in fit. Only one unit must be fitted to the saw plate for each segment as opposed to five or six in the riveted construction, and fitting to adjacent segments and stabilization between segments in very easy and secure.

A further disadvantage of the old art type segmental saw construction, in which the segment ends are made substantially parallel to respective radii of the saw plate, is that with repeated sharpenings (FIG. 7 compared with FIG. 8) the saw teeth T tend to be moved backward, thus moving the separation line between segments from the bottom of the gullet to a position through the central body of the last tooth. This split in the last tooth often results in premature breaking of the tooth the diameter of the saw is fully reduced.

In contrast, according to this invention the segment ends 22 incline at the characteristic front sharpening angle "a" of the teeth 20 so that with repeated sharpenings as the saw teeth tend to move backward they will more or less follow back and down the inclined line of separation between the segments, thus leaving the parting line in the bottom of the tooth gullet and the last tooth solid and at full strength (FIG. 9 compared with FIG. 10). As a further advantage, the incline of the segment ends indicates the correct front sharpening angle for the teeth.

In laying out the inclination angle, one method is to project a radius of the saw blade through a point midway over a gullet on the major circle swept by the teeth, and then to project the segment end line through that point also at the desired angle relative to the radius. Other arrangements may be used to achieve the same result in substance.

FIG. 11 shows in embodiment 110 that the inclined-end segment configuration is also applicable to the conventional riveted construction previously described, although the segments may tend to lift out under stress more readily than in the preferred embodiment.

Obviously many modifications and variations of the present invention are possible in light of the above teachings. It is, therefore, to be understood that within the scope of the appended claims the invention may be practiced otherwise than as specifically described.

What is claimed and desired to be secured by United States Letters Patent is:

1. In a circular sawblade assembly having a saw plate and a plurality of arc-shaped toothed segments adapted for mounting around the saw plate periphery with ends abutting to form a continuous periphery, the improvement comprising: the saw plate having a peripheral annularly stepped web, square edged and offset in section, each of said plurality of segments having a web complementary in shape to said saw plate web, all said saw plate web and segment webs having equal thickness, all said webs being respectively one-half of thickness of adjacent portions of said saw plate and segments, a metallic alloy joining all said segments to the saw plate and joining the abutting ends of all said segments, each said segment having at least one tooth, said at least one tooth having a shape requiring sharpening at an angle to a radial direction through said at least one tooth, and said abutting ends of each said segment inclining substantially at said sharpening angle and intersecting respective gullets between said teeth.

2. In a circular sawblade assembly having a saw plate and a plurality of arc-shaped toothed segments adapted for mounting around the saw plate periphery with ends abutting to form a continuous periphery, the improvement comprising: the saw plate having a peripheral annularly stepped web, square edged and offset in section, each of said plurality of segments having a web complementary in shape to said saw plate web, all said saw plate web and segment webs having equal thickness, all said webs being respectively one-half of thickness of adjacent portions of said saw plate and segments, a metallic alloy joining all said segment to the saw plate and joining the abutting ends of all said segments, the teeth of said segments having a characteristic front sharpening angle relative to respective radii of the sawblade assembly passing therethrough, the ends of said abutting segments inclining at said front sharpening angle of teeth respectively proximate said ends; and the respective end abutments of the segments intersecting the periphery of said sawblade assembly medianly between said teeth, in spaced relation with the faces of said teeth, whereby upon repeated sharpening of said teeth the ends of said abutting segments remain between said teeth.

3. In a circular sawblade assembly having a saw plate and a plurality of arc-shaped segments adapted for mounting around the saw plate periphery with ends abutting, with teeth on said segments having a characteristic front sharpening angle, and gullets between said teeth, the improvement comprising: the saw plate having a peripheral annularly stepped web, each segment having a web complementary to said saw plate web, and the ends of the segments inclined relative to respective radii of the sawblade assembly in accordance with said characteristic front sharpening angle of the teeth and spaced from the teeth with all said abutting ends positioned at respective gullets between said teeth, whereby upon repeated sharpenings of said teeth the junctions of said abutting ends remain in said respective gullets.

4. In a circular sawblade assembly having a saw plate, a plurality of segments adapted for mounting around the saw plate periphery with ends abutting, and teeth on the segments having a characteristic sharpening angle, the improvement comprising: the ends of all the segments inclined in accordance with said characteristic sharpening angle and respectively passing substantially midway between teeth adjacent thereto, whereby upon repeated sharpening of said teeth the inclined ends of the respective segments remain between said teeth.

* * * * *